US012785110B2

(12) United States Patent
Suzuki

(10) Patent No.: US 12,785,110 B2
(45) Date of Patent: Nov. 3, 2026

(54) STACKED BATTERY

(71) Applicant: TOYOTA JIDOSHA KABUSHIKI KAISHA, Toyota (JP)

(72) Inventor: Yushi Suzuki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 466 days.

(21) Appl. No.: 18/435,630

(22) Filed: Feb. 7, 2024

(65) Prior Publication Data

US 2024/0304824 A1 Sep. 12, 2024

(30) Foreign Application Priority Data

Mar. 9, 2023 (JP) ................................ 2023-036599

(51) Int. Cl.
*H01M 4/78* (2006.01)
*H01M 10/0562* (2010.01)

(52) U.S. Cl.
CPC ......... *H01M 4/78* (2013.01); *H01M 10/0562* (2013.01); *H01M 2300/0068* (2013.01)

(58) Field of Classification Search
CPC ............... H01M 4/78; H01M 10/0562; H01M 2300/0068; H01M 2300/0065; H01M 10/0436; H01M 10/0583; H01M 50/512; H01M 50/533; H01M 50/54; H01M 10/0413; H01M 4/13; H01M 4/70; H01M 10/052; H01M 10/0525; H01M 10/0585; H01M 50/531; H01M 50/586; H01M 50/593; H01M 50/204; Y02E 60/10; Y02P 70/50
See application file for complete search history.

(56) References Cited

U.S. PATENT DOCUMENTS

2018/0301761 A1* 10/2018 Miyake ................. H01M 50/54
2025/0030135 A1* 1/2025 Suzuki ................ H01M 10/052

FOREIGN PATENT DOCUMENTS

JP 2003168416 A * 6/2003
JP 2013-114929 A 6/2013
WO WO-2020183794 A1 * 9/2020 ........ H01M 10/0585

* cited by examiner

*Primary Examiner* — Muhammad S Siddiquee
(74) *Attorney, Agent, or Firm* — Oliff PLC

(57) ABSTRACT

A stacked battery includes a stack of cells each having an electrode body including positive electrode current collector, positive electrode, electrolyte, negative electrode, and negative electrode current collector stacked in that order, a first insulating material arranged on an opposite side of the positive electrode across a first part of the positive electrode current collector, and a second insulating material arranged on an opposite side of the negative electrode across a first part of the negative electrode current collector, the positive electrode current collector has the first part of the positive electrode current collector, a second part of the positive electrode current collector, and a third part of the positive electrode current collector, the negative electrode current collector has the first part of the negative electrode current collector, a second part of the negative electrode current collector, and a third part of the negative electrode current collector.

4 Claims, 7 Drawing Sheets

STACKED BATTERY

FIELD

The present disclosure relates to a stacked battery.

BACKGROUND

PTL 1 (Japanese Unexamined Patent Publication No. 2003-168416) describes the art of stacking cells in an all-solid state battery to realize a parallel connection or serial connection of a plurality of cells. In the art described in PTL 1, insulating boards are arranged at the top side and bottom side of a power generating element including positive electrode current collector, positive electrode, solid electrolyte, negative electrode, and negative electrode current collector stacked together. A metal pattern (extraction electrode) is provided at the top surface of the insulating board at the top side, while a metal pattern (extraction electrode) is provided at the bottom surface of the insulating board at the bottom side. Due to this, a unit cell of an all-solid-state battery is configured.

In the art described in PTL 1, if, for example, two unit cells are stacked, the metal pattern provided at the bottom surface of the bottom side insulating board of the top side unit cell and the metal pattern provided at the top surface of the top side insulating board of the bottom side unit cell are made to contact. That is, in the art described in PTL 1, if, for example, two unit cells are stacked, between the power generating element of the top side unit cell and the power generating element of the bottom side unit cell, the bottom side insulating board of the top side unit cell, the metal pattern provided at the bottom surface of the bottom side insulating sheet of the top side unit cell, the top side insulating board of the bottom side unit cell, and the metal pattern provided at the top surface of the top side insulating board of the bottom side unit cell exist. For this reason, in the art described in PTL 1, it is not possible to sufficiently keep down the dimensions in the stacking direction of a stacked battery configured by stacking a plurality of unit cells.

SUMMARY

In consideration of the above-mentioned point, the present disclosure has as its object the provision of a stacked battery able to sufficiently keep down the dimensions in the stacking direction.

(1) One aspect of the present disclosure is a stacked battery including a stack of cells each having an electrode body including positive electrode current collector, positive electrode, electrolyte, negative electrode, and negative electrode current collector stacked in that order, a first insulating material arranged on an opposite side of the positive electrode across a first part of the positive electrode current collector, and a second insulating material arranged on an opposite side of the negative electrode across a first part of the negative electrode current collector, wherein the positive electrode current collector has the first part of the positive electrode current collector, a second part of the positive electrode current collector, and a third part of the positive electrode current collector extending in a stacking direction of the cells and connecting the first part of the positive electrode current collector and the second part of the positive electrode current collector, the second part of the positive electrode current collector is arranged on an opposite side of the first part of the negative electrode current collector across the second insulating material, the negative electrode current collector has the first part of the negative electrode current collector, a second part of the negative electrode current collector, and a third part of the negative electrode current collector extending in the stacking direction and connecting the first part of the negative electrode current collector and the second part of the negative electrode current collector, the second part of the negative electrode current collector is arranged on an opposite side from the first part of the positive electrode current collector across the first insulating material, the first insulating material is arranged so as not to overlap both of the second insulating material and the second part of the positive electrode current collector in the stacking direction, and the second part of the negative electrode current collector is arranged so as not to overlap both of the second insulating material and the second part of the positive electrode current collector in the stacking direction.

(2) In the stacked battery of the aspect (1), the electrolyte may be a solid electrolyte.

(3) In the stacked battery of the aspect (1), the thickness of a cell may be 0.1 to 2 mm.

(4) In the stacked battery of the aspect (1), the third part of the positive electrode current collector may be arranged on an opposite side of the third part of the negative electrode current collector across the positive electrode, the electrolyte, and negative electrode.

According to the present disclosure, it is possible to sufficiently keep down the dimensions of a stacked battery in the stacking direction.

DESCRIPTION OF EMBODIMENTS

Below, embodiments of a stacked battery of the present disclosure will be explained with reference to the drawings.

First Embodiment

Figure 1A:
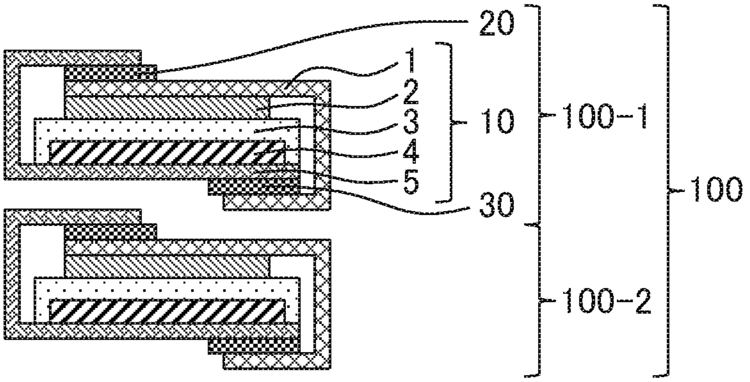
FIG. 1A schematically shows one example of a cross-section of a stacked battery 100 of the first embodiment.
Figure 1B:
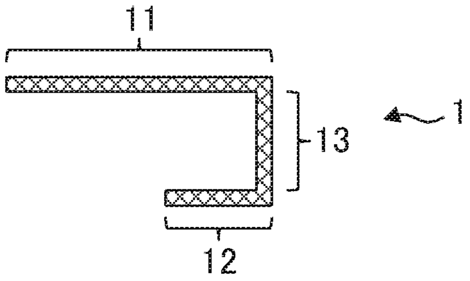
FIG. 1B shows a positive electrode current collector 1 of a cell 100-1 included in the stacked battery 100 of the first embodiment shown in FIG. 1A pulled out.
Figure 1C:
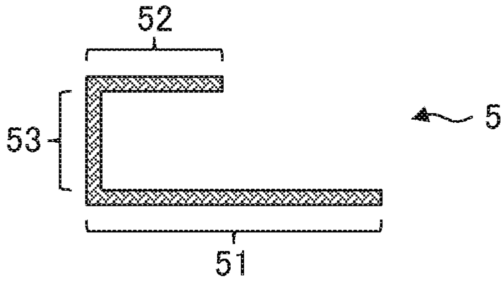
FIG. 1C shows a negative electrode current collector 5 of the cell 100-1 included in the stacked battery 100 of the first embodiment shown in FIG. 1A pulled out.
Figure 2A:
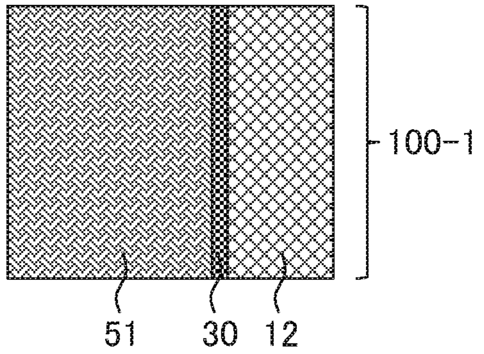
FIG. 2A is a view of the cell 100-1 seen from below FIG. 1A.
Figure 2B:
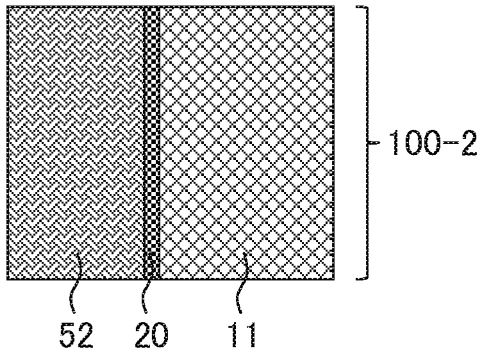
FIG. 2B is a view of a cell 100-2 seen from above FIG. 1A.
Figure 3:
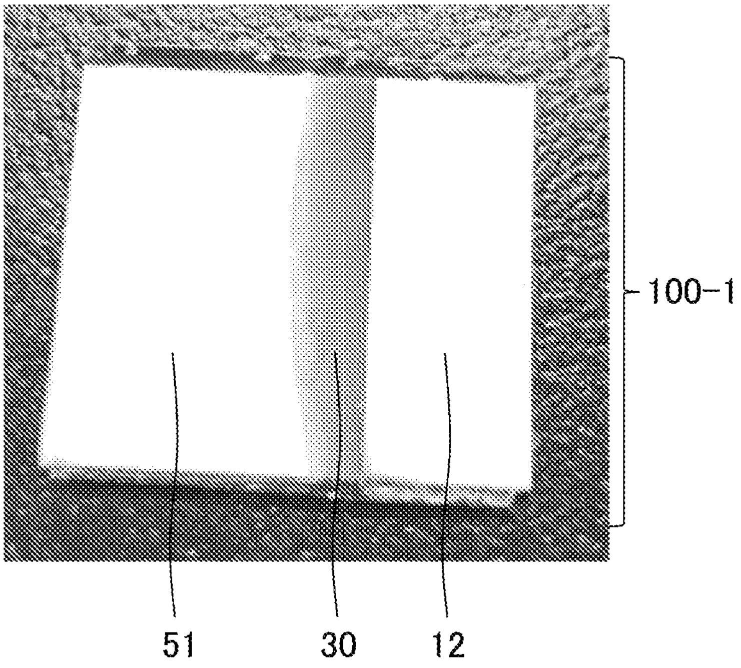
FIG. 3 is a photo of a prototype of the cell 100-1 shown in FIG. 2A.

FIG. 1A to FIG. 1C are views schematically showing one example of a stacked battery 100 of a first embodiment. In more detail, FIG. 1A schematically shows the example of a cross-section of the stacked battery 100 of the first embodiment, FIG. 1B shows a positive electrode current collector 1 of a cell 100-1 included in the stacked battery 100 of the first embodiment shown in FIG. 1A pulled out, and FIG. 1C shows a negative electrode current collector 5 of the cell 100-1 included in the stacked battery 100 of the first embodiment shown in FIG. 1A pulled out. FIG. 2A and FIG. 2B are views schematically showing one example of cells 100-1 and 100-2 included in the stacked battery 100 of the first embodiment. In more detail, FIG. 2A is a view of the cell 100-1 seen from below FIG. 1A, while FIG. 2B is a view of a cell 100-2 seen from above FIG. 1A. FIG. 3 is a photo of a prototype of the cell 100-1 shown in FIG. 2A.

In the example shown in FIG. 1A to FIG. 3, the stacked battery 100 includes the cell 100-1 and the cell 100-2 and is configured by stacking the cell 100-1 and the cell 100-2.

In another example, the stacked battery 100 includes any number of cells other than two (however, several) and is configured by stacking these cells.

In the example shown in FIG. 1A to FIG. 3, the cell 100-1 and the cell 100-2 have the same configurations.

In another example, the respective configurations of the plurality of cells included in the stacked battery 100 need not be completely the same.

In the example shown in FIG. 1A to FIG. 3, the cell 100-1 has electrode body 10, first insulating material 20, and second insulating material 30.

The first insulating material 20 and second insulating material 30 are configured by for example resin material having electrical insulation function and sealing function.

In more detail, in the example shown in FIG. 3, the first insulating material 20 and second insulating material 30 are configured by PP (polypropylene).

In another example, the first insulating material 20 and second insulating material 30 may be configured by resin material other than PP film (however, resin material having the electrical insulation function and the sealing function).

In the example shown in FIG. 1A to FIG. 3, the electrode body 10 includes positive electrode current collector 1, positive electrode 2, separator 3 including electrolyte (for example, the separator 3 in which the electrolyte is impregnated), negative electrode 4, and negative electrode current collector 5 stacked in that order.

As the positive electrode current collector 1, anything able to be used as the positive electrode current collector of this type of battery can be used without particular limitation. Typically, the positive electrode current collector 1 is, for example, configured by a metal material having good conductivity such as aluminum, nickel, titanium, and stainless steel.

The positive electrode current collector 1 is preferably a collector having oxidation resistance. In the example shown in FIG. 3, as the positive electrode current collector 1, aluminum foil is used.

As the positive electrode material forming the positive electrode 2, for example, LiNiCoMn, SE (solid electrolyte) ($LiI—LiBr—Li_2S—P_2S_5$), VGCF (vapor grown carbon fibers), and SBR (styrene-butadiene rubber) mixed together can be used. Positive electrode active substance, conductivity aid, and adhesive material contained in the positive electrode 2 are not particularly designated.

That is, the positive electrode 2 may also contain electrolyte. If the positive electrode 2 contains the electrolyte, the electrolyte is preferably a solid electrolyte with a high heat resistance (sulfide or oxide). This is because a solid electrolyte which is strong against heat is necessary to enable hot bonding of the first insulating material 20 and second insulating material 30 used as the sealing material.

For example, an positive electrode composite paste obtained by mixing positive electrode active substance, conductivity aid, and binding material (adhesive material) and organic solvent (for example, N-methyl-2-pyrrolidone (NMP)) can be coated and dried on the positive electrode current collector 1 to form an positive electrode composite layer on the positive electrode current collector 1, then the positive electrode composite layer is rolled to a predetermined thickness to thereby prepare the positive electrode 2. As the positive electrode active substance, for example, $LiCoO_2$, $LiNiO_2$, $LiNi_aCo_bO_2$ ($a+b=1$, $0<a<1$, $0<b<1$), $LiMnO_2$, $LiMn_2O_4$, $LiNi_aCo_bMn_cO_2$ ($a+b+c=1$, $0<a<1$, $0<b<1$, $0<c<1$), $LiFePO_4$, etc. can be used. Further, as the conductivity aid, for example, acetylene black (AB) etc. can be used. As binder material, for example, polyvinylidene fluoride (PVdF) etc. can be used.

The electrolyte included in the separator 3 is preferably the solid electrolyte having high heat resistance for the above-mentioned reason.

In the example shown in FIG. 3, as the material forming the separator 3, SE and SBR mixed together are used.

The separator 3 may be substantially comprised of solid electrolyte material. The separator 3, for example, may further contain a binder etc. The separator 3 can include any solid electrolyte material. The separator 3, for example, may include $Li_2S—P_2S_5$-based solid electrolyte etc.

As negative electrode material forming the negative electrode 4, for example, graphite, SE ($LiI—LiBr—Li_2S—P_2S_5$), VGCF, and SBR mixed together may be used. Negative electrode active substance, conductivity aid, and adhesive material contained in the negative electrode 4 are not particularly designated.

That is, the negative electrode 4 may contain electrolyte. If the negative electrode 4 contains the electrolyte, the electrolyte is preferably the solid electrolyte with high heat resistance for the above-mentioned reason.

As the negative electrode current collector 5, ones able to be used as the negative electrode current collector of this type of battery can be used without particular limitation.

The negative electrode current collector 5 is preferably a current collector having reduction resistance. In the example shown in FIG. 3, as the negative electrode current collector 5, nickel foil is used.

As shown in FIG. 1B, the positive electrode current collector 1 has first part 11, second part 12, and third part 13. The third part 13 extends in the stacking direction (up-down direction of FIG. 1B) of the cell 100-1 and connects the first part 11 and second part 12.

As shown in FIG. 1C, the negative electrode current collector 5 has first part 51, second part 52, and third part 53. The third part 53 extends in the stacking direction (up-down direction of FIG. 1C) of the cell 100-1 and connects the first part 51 and second part 52.

As shown in FIG. 1A and FIG. 1B, the first insulating material 20 is arranged on an opposite side (top side of FIG. 1A) of the positive electrode 2 across the first part 11 of the positive electrode current collector 1.

As shown in FIG. 1A and FIG. 1C, the second insulating material 30 is arranged on an opposite side (bottom side of FIG. 1A) of the negative electrode 4 across the first part 51 of the negative electrode current collector 5.

As shown in FIG. 1A, FIG. 1B, and FIG. 1C, the second part 12 of the positive electrode current collector 1 is arranged on an opposite side (bottom side of FIG. 1A, FIG. 1B, and FIG. 1C) of the first part 51 of the negative electrode current collector 5 across the second insulating material 30. The second part 52 of the negative electrode current collector 5 is arranged on an opposite side (top side of FIG. 1A, FIG. 1B, and FIG. 1C) of the first part 11 of the positive electrode current collector 1 across the first insulating material 20.

As shown in FIG. 1A, FIG. 1B, and FIG. 1C, the third part 13 of the positive electrode current collector 1 is arranged on an opposite side (right side of FIG. 1A) of the third part 53 of the negative electrode current collector 5 across the positive electrode 2, the separator 3 including the electrolyte, and the negative electrode 4.

As shown in FIG. 1A, the first insulating material 20 is arranged so as not to overlap the second insulating material 30 in the stacking direction (up-down direction of FIG. 1A) of the cell 100-1. That is, the position of the first insulating material 20 in the left-right direction of FIG. 1A and the position of the second insulating material 30 in the left-right direction of FIG. 1A are offset (made different).

As shown in FIG. 1A and FIG. 1B, the first insulating material 20 is arranged so as not to overlap the second part 12 of the positive electrode current collector 1 in the stacking direction of the cell 100-1. That is, the position of the first insulating material 20 in the left-right direction of FIG. 1A and the position of the second part 12 of the positive electrode current collector 1 in the left-right direction of FIG. 1A are offset (made different).

As shown in FIG. 1A and FIG. 1C, the second part 52 of the negative electrode current collector 5 is arranged so as not to overlap the second insulating material 30 in the stacking direction of the cell 100-1. That is, the position of the second part 52 of the negative electrode collector 5 in the left-right direction of FIG. 1A and the position of the second insulating material 30 in the left-right direction of FIG. 1A are offset (made different).

As shown in FIG. 1A, FIG. 1B, and FIG. 1C, the second part 52 of the negative electrode current collector 5 is arranged so as not to overlap the second part 12 of the positive electrode current collector 1 in the stacking direction of the cell 100-1. That is, the position of the second part 52 of the negative electrode current collector 5 in the left-right direction of FIG. 1A and the position of the second part 12 of the positive electrode current collector 1 in the left-right direction of FIG. 1A are offset (made different).

In the example shown in FIG. 1A to FIG. 3, the respective thicknesses of the cells 100-1 and 100-2 in the stacking direction are, for example, 0.1 to 2 mm.

As a result, in the example shown in FIG. 1A to FIG. 3, the second part 12 of the positive electrode current collector 1 of the cell 100-1 and the first part 11 of the positive electrode current collector 1 of the cell 100-2 can be made to contact and the first part 51 of the negative electrode current collector 5 of the cell 100-1 and the second part 52 of the negative electrode current collector 5 of the cell 100-2 can be made to contact in order to stack the cell 100-1 and the cell 100-2 and can keep down the dimensions of the stacked battery 100 in the stacking direction.

Further, in the example shown in FIG. 1A to FIG. 3, by stacking the cell 100-1 and the cell 100-2 in this way, it is possible to easily connect in parallel the cell 100-1 and the cell 100-2.

Second Embodiment

The stacked battery 100 of a second embodiment is configured in the same way as the stacked battery 100 of the above-mentioned first embodiment except for the points explained later.

Figure 4A:
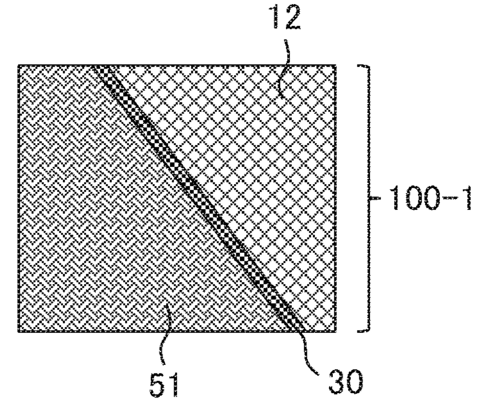
FIG. 4A is a view of the cell 100-1 seen from a side of the cell 100-2 in the stacking direction of the stacked battery 100 of a second embodiment.
Figure 4B:
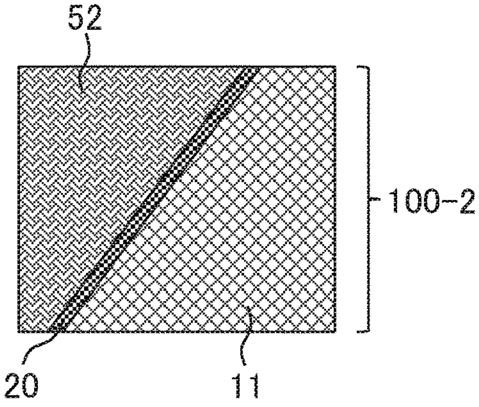
FIG. 4B is a view of the cell 100-2 seen from a side of the cell 100-1 in the stacking direction of the stacked battery 100 of the second embodiment.

FIG. 4A and FIG. 4B are views schematically showing one example of the cells 100-1 and 100-2 included in the stacked battery 100 of the second embodiment. In more detail, FIG. 4A is a view of the cell 100-1 seen from a side of the cell 100-2 in the stacking direction of the stacked battery 100 of the second embodiment, while FIG. 4B is a view of the cell 100-2 seen from a side of the cell 100-1 in the stacking direction of the stacked battery 100 of the second embodiment.

As shown in FIG. 2A, FIG. 2B, FIG. 4A, and FIG. 4B, when making the second part 12 of the positive electrode current collector 1 of the cell 100-1 and the first part 11 of the positive electrode current collector 1 of the cell 100-2 contact to stack the cell 100-1 and the cell 100-2, so long as the second part 12 of the positive electrode current collector 1 of the cell 100-1 does not contact either of the second part 52 of the negative electrode current collector 5 and first insulating material 20 of the cell 100-2, it is possible to set the shape of the second part 12 of the positive electrode current collector 1 of the cell 100-1 shown in FIG. 2A and FIG. 4A to any shape. Further, when making the first part 51 of the negative electrode current collector 5 of the cell 100-1 and the second part 52 of the negative electrode current collector 5 of the cell 100-2 contact to stack the cell 100-1 and the cell 100-2, so long as the second part 52 of the negative electrode current collector 5 of the cell 100-2 does not contact either of the second part 12 of the positive electrode current collector 1 and second insulating material 30 of the cell 100-1, it is possible to set the shape of the second part 52 of the negative electrode current collector 5 of the cell 100-2 shown in FIG. 2B and FIG. 4B to any shape.

EXAMPLES

Figure 5A:
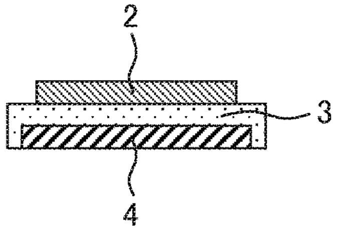
FIG. 5A is a cross-sectional view of an assembly of positive electrode 2, separator 3, and negative electrode 4 configuring part of the stacked battery 100 of an example.
Figure 5B:
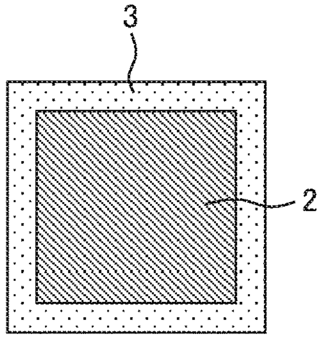
FIG. 5B is a view of the assembly shown in FIG. 5A seen from above FIG. 5A.
Figure 6A:
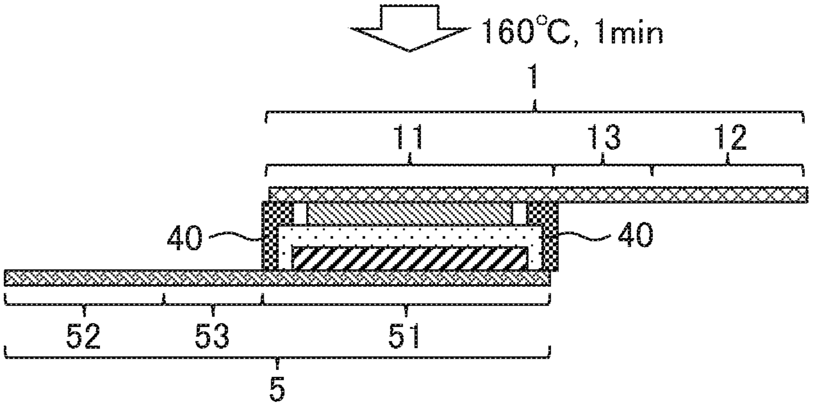
FIG. 6A is a cross-sectional view of the assembly which is in a state in which positive electrode current collector 1, negative electrode current collector 5, and insulating material (seal material) 40 are added to the assembly shown in FIG. 5A.
Figure 6B:
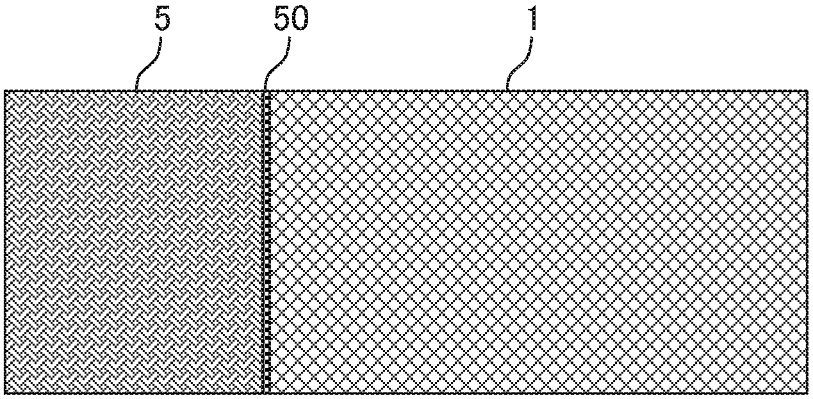
FIG. 6B is a view of the assembly shown in FIG. 6A seen from above FIG. 6A.
Figure 7A:
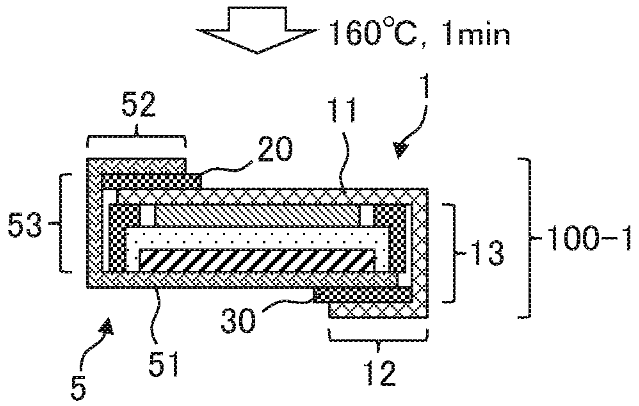
FIG. 7A is a cross-sectional view of the cell 100-1 configured by second part 12 and third part 13 of the positive electrode current collector 1 and second part 52 and third part 53 of the negative electrode current collector 5 of the assembly shown in FIG. 6A being wound around the positive electrode 2, the separator 3, and the negative electrode 4 via first insulating material 20 and second insulating material 30.
Figure 7B:
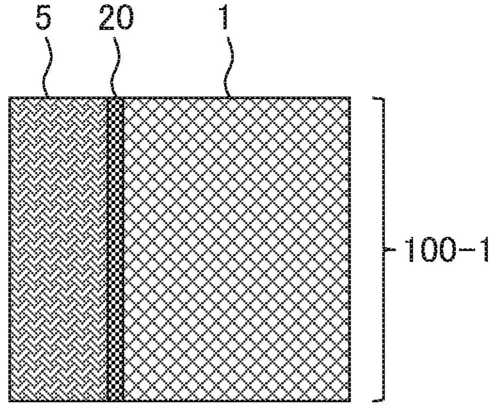
FIG. 7B is a view of the cell 100-1 shown in FIG. 7A seen from above FIG. 7A.
Figure 8:
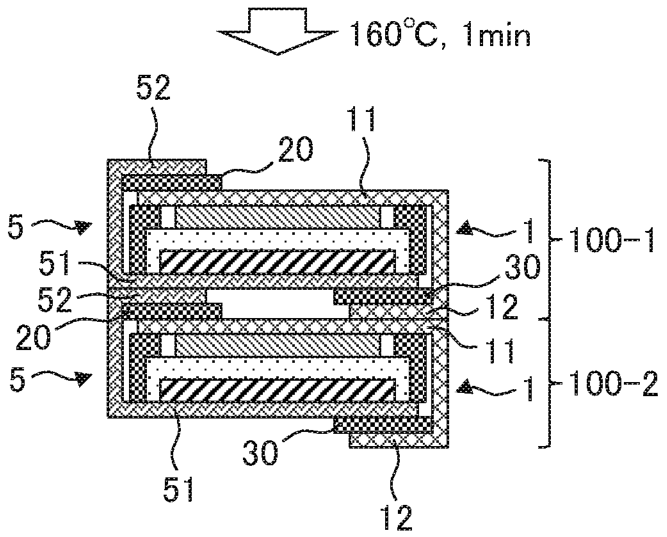
FIG. 8 is a cross-sectional view of the stacked battery 100 configured by stacking the cell 100-1 shown in FIG. 7A and the cell 100-2 configured in the same way as the cell 100-1.
Figure 9:
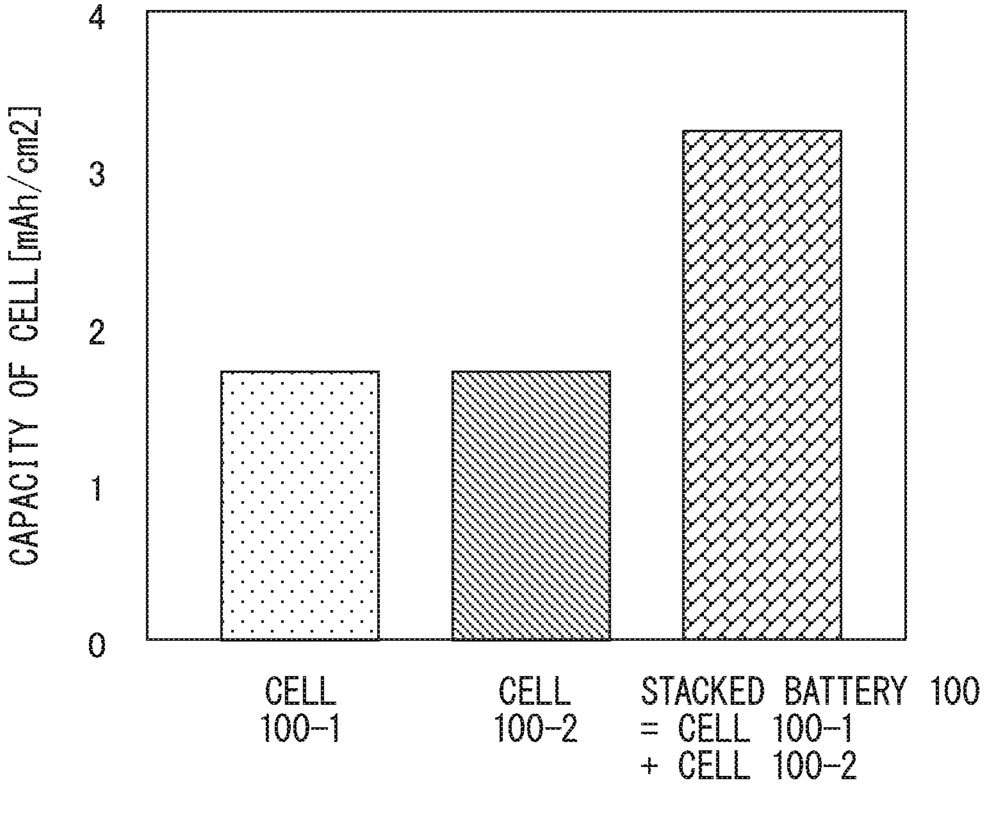
FIG. 9 is a view showing in comparison a cell capacity of the cell 100-1 and the cell capacity of the cell 100-2 and cell capacity of the stacked battery 100.

FIG. 5A to FIG. 8 are views for explaining a process of production of the stacked battery 100 of an example. In more detail, FIG. 5A is a cross-sectional view of an assembly of the positive electrode 2, the separator 3, and the negative electrode 4 configuring part of the stacked battery 100 of the example, while FIG. 5B is a view of the assembly shown in FIG. 5A seen from above FIG. 5A. FIG. 6A is a cross-sectional view of the assembly which is in a state in which the positive electrode current collector 1, the negative electrode current collector 5, and insulating material (seal material) 40 are added to the assembly shown in FIG. 5A, while FIG. 6B is a view of the assembly shown in FIG. 6A seen from above FIG. 6A. FIG. 7A is a cross-sectional view of the cell 100-1 configured by the second part 12 and the third part 13 of the positive electrode current collector 1 and the second part 52 and the third part 53 of the negative electrode current collector 5 of the assembly shown in FIG. 6A being wound around the positive electrode 2, the separator 3, and the negative electrode 4 via the first insulating material 20 and the second insulating material 30, while FIG. 7B is a view of the cell 100-1 shown in FIG. 7A seen from above FIG. 7A. FIG. 8 is a cross-sectional view of the stacked battery 100 configured by stacking the cell 100-1 shown in FIG. 7A and the cell 100-2 configured in the same way as the cell 100-1. FIG. 9 is a view showing in comparison a cell capacity of the cell 100-1 and the cell capacity of the cell 100-2 and the cell capacity of the stacked battery 100.

In the example shown in FIG. 5A to FIG. 9, as the positive electrode material forming the positive electrode 2, LiNiCoMn, SE (LiI—LiBr—$Li_2S$—$P_2S_5$), VGCF, and SBR mixed together were used. As the negative electrode material forming the negative electrode 4, graphite, SE (LiI—LiBr—$Li_2S$—$P_2S_5$), VGCF, and SBR mixed together were used. As the material forming the separator 3, SE and SBR mixed together were used. As the first insulating material 20, the second insulating material 30, and the insulating material (sealing material) 40, PP film was used. As the positive electrode current collector 1, aluminum foil was used. As the negative electrode current collector 5, nickel foil was used.

In the state shown in FIG. 6A and FIG. 6B, heating at 160° C. for 1 minute was performed to seal the positive electrode 2, the separator 3, and the negative electrode 4 positioned between the positive electrode current collector 1 and the negative electrode current collector 5 by the insulating material (sealing material) 40.

In the state shown in FIG. 7A and FIG. 7B, the second part 12 and the third part 13 of the positive electrode current collector 1 and the second part 52 and the third part 53 of the negative electrode current collector 5 were wound around the positive electrode 2, the separator 3, the negative electrode 4, and the insulating material (sealing material) 40. Heating at 160° C. for 1 minute was performed to seal it by the first insulating material 20 and the second insulating material 30.

The cell 100-1 shown in FIG. 7A and FIG. 7B is configured by sealing the electrode body 10 including the positive electrode current collector 1, the positive electrode 2, the separator 3 including the electrolyte, the negative electrode 4, and the negative electrode current collector 5 stacked in that order, by the positive electrode current collector 1, the negative electrode current collector 5, the first insulating material 20, and the second insulating material 30.

In the state shown in FIG. 8, heating at 160° C. for 1 minute was performed to make the second insulating material 30 of the cell 100-1 and the first insulating material 20 of the cell 100-2 bond with each other and secure the electrical insulating property between the second part 12 of the positive electrode current collector 1 of the cell 100-1 and the second part 52 of the negative electrode current collector 5 of the cell 100-2.

The stacked battery 100 shown in FIG. 8 is configured by the second part 12 of the positive electrode current collector 1 being wound over the first part 51 of the negative electrode current collector 5 via the second insulating material 30 and by the second part 52 of the negative electrode current collector 5 being wound over the first part 11 of the positive electrode current collector 1 via the first insulating material 20 so that the positive electrode current collector 1 contacts the positive electrode current collector 1 and the negative electrode current collector 5 contact the negative electrode current collector 5 at the time of stacking the cell 100-1 and the cell 100-2.

The charging and discharging of the cell 100-1 and the cell 100-2 were evaluated under the following conditions:

4.0 to 3.0V
0.6 $mA/cm^2$
25° C.

Using the stacked battery 100 including the cell 100-1 and the cell 100-2 stacked together, charging and discharging were performed under the following conditions:

4.0 to 3.0V
1.2 $mA/cm^2$
25° C.

The respective CC (constant current) discharge capacities of the cell 100-1, the cell 100-2, and the stacked battery 100 became as shown in FIG. 9. It was confirmed that parallel capacities (capacity of cell 100-1+capacity of cell 100-2) can be realized by simple stacking of the cell 100-1 and the cell 100-2.

In the above way, embodiments of the stacked battery of the present disclosure were explained with reference to the drawings, but the stacked battery of the present disclosure is not limited to the above-mentioned embodiments and can be suitably changed within a range not deviating from the gist of the present disclosure. The configurations of the examples of the above-mentioned embodiments may also be be suitably combined.

The invention claimed is:

1. A stacked battery comprising a stack of cells each having an electrode body including positive electrode current collector, positive electrode, electrolyte, negative electrode, and negative electrode current collector stacked in that order, a first insulating material arranged on an opposite side of the positive electrode across a first part of the positive electrode current collector, and a second insulating material arranged on an opposite side of the negative electrode across a first part of the negative electrode current collector, wherein the positive electrode current collector has the first part of the positive electrode current collector, a second part of the positive electrode current collector, and a third part of the positive electrode current collector extending in a stacking direction of the cells and connecting the first part of the positive electrode current collector and the second part of the positive electrode current collector, the second part of the positive electrode current collector is arranged on an opposite side of the first part of the negative electrode current collector across the second insulating material, the negative electrode current collector has the first part of the negative electrode current collector, a second part of the negative electrode current collector, and a third part of the negative electrode current collector extending in the stacking direction and connecting the first part of the negative electrode current collector and the second part of the negative electrode current collector, the second part of the negative electrode current collector is arranged on an opposite side from the first part of the positive electrode current collector across the first insulating material, the first insulating material is arranged so as not to overlap both of the second insulating material and the second part of the positive electrode current collector in the stacking direction, and the second part of the negative electrode current collector is arranged so as not to overlap both of the second insulating material and the second part of the positive electrode current collector in the stacking direction.

2. The stacked battery according to claim 1, wherein the electrolyte is a solid electrolyte.

3. The stacked battery according to claim 1, wherein the thickness of a cell is 0.1 to 2 mm.

4. The stacked battery according to claim 1, wherein the third part of the positive electrode current collector is arranged on an opposite side of the third part of the negative electrode current collector across the positive electrode, the electrolyte, and negative electrode.

* * * * *